(12) United States Patent
Mullaney

(10) Patent No.: US 6,494,148 B1
(45) Date of Patent: Dec. 17, 2002

(54) STEERING WHEEL ATTACHABLE TABLE

(76) Inventor: Doug Mullaney, 11150 SW. 13th St., #815B, Miami, FL (US) 33174

( * ) Notice: Subject to any disclaimer, the term of this patent is extended or adjusted under 35 U.S.C. 154(b) by 0 days.

(21) Appl. No.: 09/901,753

(22) Filed: Jul. 10, 2001

(51) Int. Cl.⁷ .............................................. A47B 23/00
(52) U.S. Cl. ......................................... 108/44; 108/47
(58) Field of Search ........................... 108/43, 44, 152, 108/47, 48; 224/276

(56) References Cited

U.S. PATENT DOCUMENTS

| | | | | |
|---|---|---|---|---|
| 2,746,821 A | * | 5/1956 | Schroeder | |
| 4,749,161 A | | 6/1988 | Falcone | ................... 248/447.2 |
| 4,890,559 A | * | 1/1990 | Martin | |
| 5,386,785 A | * | 2/1995 | Naor | |
| 5,662,047 A | * | 9/1997 | Metcalf | |
| 5,749,305 A | * | 5/1998 | Jacovelli | |
| 5,749,306 A | * | 5/1998 | Breuner | |
| 5,845,585 A | | 12/1998 | Meeus | .......................... 108/44 |
| 6,038,983 A | * | 3/2000 | Lendl | |
| 6,279,800 B1 | * | 8/2001 | Lee | |

FOREIGN PATENT DOCUMENTS

JP                      246974          * 9/2001

* cited by examiner

Primary Examiner—Jose V. Chen
(74) Attorney, Agent, or Firm—Goldstein & Lavas, P.C.

(57) ABSTRACT

A steering wheel attachable table including a tray portion having a generally rectangular configuration. The tray portion has an upper surface, a lower surface, and an upwardly extending peripheral lip. The peripheral lip has a front edge, a back edge, and opposed side edges. The back edge of the peripheral tray has a track extending a length thereof. A pair of support arms extend between the tray portion and a steering wheel. A pair of clamping members are slidably coupled with the track of the tray portion for removably coupling with the steering wheel above the pair of support arms.

7 Claims, 3 Drawing Sheets

STEERING WHEEL ATTACHABLE TABLE

BACKGROUND OF THE INVENTION

The present invention relates to a steering wheel attachable table and more particularly pertains to allowing a person occupying a vehicle to hold items in a secure manner.

The use of vehicle accessories is known in the prior art. More specifically, vehicle accessories heretofore devised and utilized for the purpose of enhancing the interior of a motor vehicle are known to consist basically of familiar, expected and obvious structural configurations, notwithstanding the myriad of designs encompassed by the crowded prior art which have been developed for the fulfillment of countless objectives and requirements.

By way of example, U.S. Pat. No. 4,749,161 to Falcone discloses an automobile steering wheel table comprised of centrally hinged panels fastened to the wheel with hooks. U.S. Pat. No. 5,749,305 to Jacovelli and U.S. Pat. No. 5,845,585 to Meeus disclose steering wheel attached tray assemblies.

While these devices fulfill their respective, particular objective and requirements, the aforementioned patents do not describe a steering wheel attachable table for allowing a person occupying a vehicle to hold items in a secure manner.

In this respect, the steering wheel attachable table according to the present invention substantially departs from the conventional concepts and designs of the prior art, and in doing so provides an apparatus primarily developed for the purpose of allowing a person occupying a vehicle to hold items in a secure manner.

Therefore, it can be appreciated that there exists a continuing need for a new and improved steering wheel attachable table which can be used for allowing a person occupying a vehicle to hold items in a secure manner. In this regard, the present invention substantially fulfills this need.

SUMMARY OF THE INVENTION

In the view of the foregoing disadvantages inherent in the known types of vehicle accessories now present in the prior art, the present invention provides an improved steering wheel attachable table. As such, the general purpose of the present invention, which will be described subsequently in greater detail, is to provide a new and improved steering wheel attachable table which has all the advantages of the prior art and none of the disadvantages.

To attain this, the present invention essentially comprises a tray portion having a generally rectangular configuration. The tray portion has a central fold line. The tray portion has an upper surface, a lower surface, and an upwardly extending peripheral lip. The peripheral lip has a front edge, a back edge, and opposed side edges. The front edge of the peripheral lip and the tray portion have a pair of arcuate recesses extending inwardly thereof. The back edge of the peripheral tray has a track extending a length thereof. The upper surface of the tray portion has a cup receiving recess formed therein. A pair of support arms extend between the tray portion and a steering wheel. The pair of support arms have upper ends secured to the lower surface of the tray portion. The pair of arms have angularly disposed segments extending outwardly from the upper ends. The angularly disposed segments have free outer ends. The free outer ends each have a pliable clip disposed thereon. The pliable clips are engagable to a lower portion of the steering wheel. A pair of clamping members are slidably coupled with the track of the tray portion for removably coupling with the steering wheel above the pliable clips of the pair of support arms. The pair of clamping members each have opposed arms with free outer ends. The free outer arms receive the steering wheel therebetween. The free outer arms have corresponding locking means with a release button whereby pressing the release button will disengage the locking means allowing the removal of the clamping members from the steering wheel.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved steering wheel attachable table which has all the advantages of the prior art vehicle accessories and none of the disadvantages.

It is another object of the present invention to provide a new and improved steering wheel attachable table which may be easily and efficiently manufactured and marketed.

It is a further object of the present invention to provide a new and improved steering wheel attachable table which is of durable and reliable construction.

An even further object of the present invention is to provide a new and improved steering wheel attachable table which is susceptible of a low cost of manufacture with regard to both materials and labor, and which accordingly is then susceptible of low prices of sale to the consuming public, thereby making such a steering wheel attachable table economically available to the buying public.

Even still another object of the present invention is to provide a new and improved steering wheel attachable table for allowing a person occupying a vehicle to hold items in a secure manner.

Lastly, it is an object of the present invention to provide a new and improved steering wheel attachable table including a tray portion having a generally rectangular configuration. The tray portion has an upper surface, a lower surface, and an upwardly extending peripheral lip. The peripheral lip has a front edge, a back edge, and opposed side edges. The back edge of the peripheral tray has a track extending a length thereof. A pair of support arms extend between the tray portion and a steering wheel. A pair of clamping members are slidably coupled with the track of the tray portion for removably coupling with the steering wheel above the pair of support arms.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various figures.

DESCRIPTION OF THE PREFERRED EMBODIMENT

Figure 1:
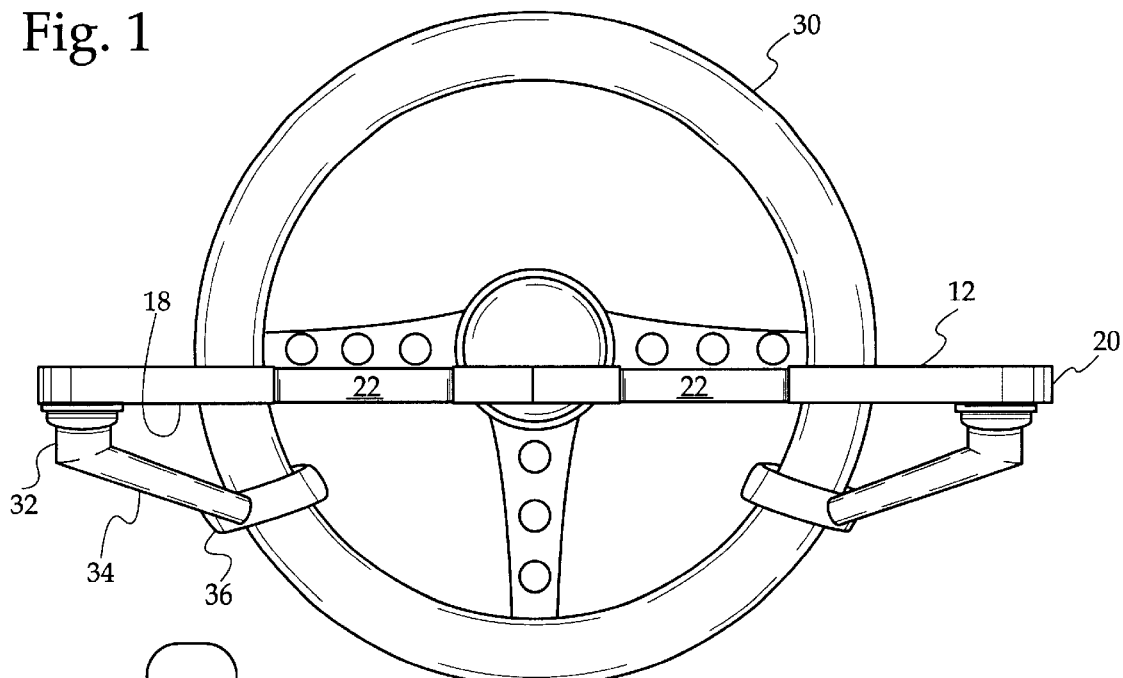
FIG. 1 is a perspective view of the preferred embodiment of the steering wheel attachable table constructed in accordance with the principles of the present invention.
Figure 2:
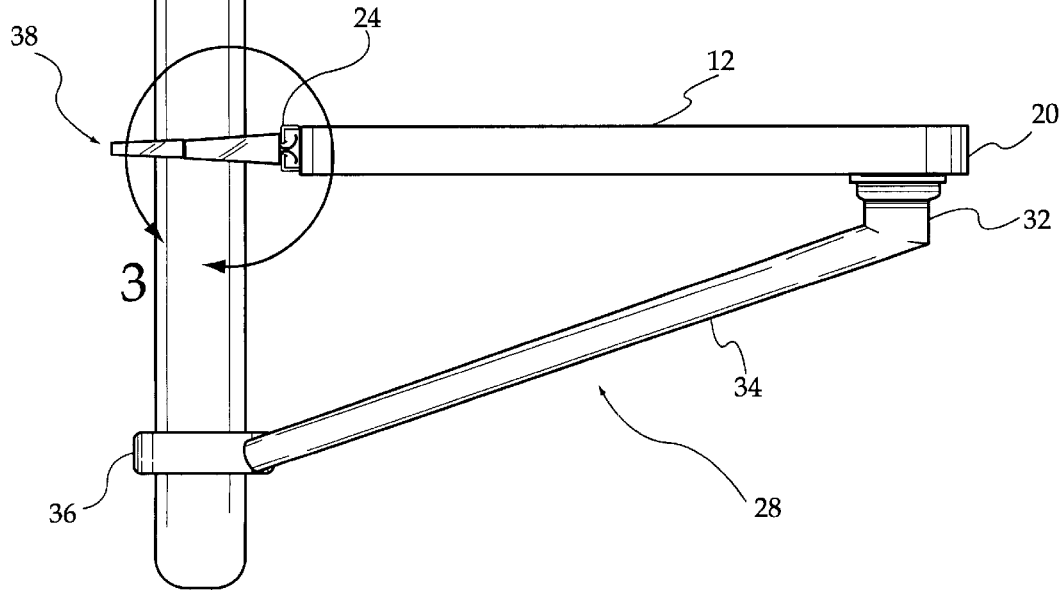
FIG. 2 is a side view of the present invention illustrated in use.
Figure 3:
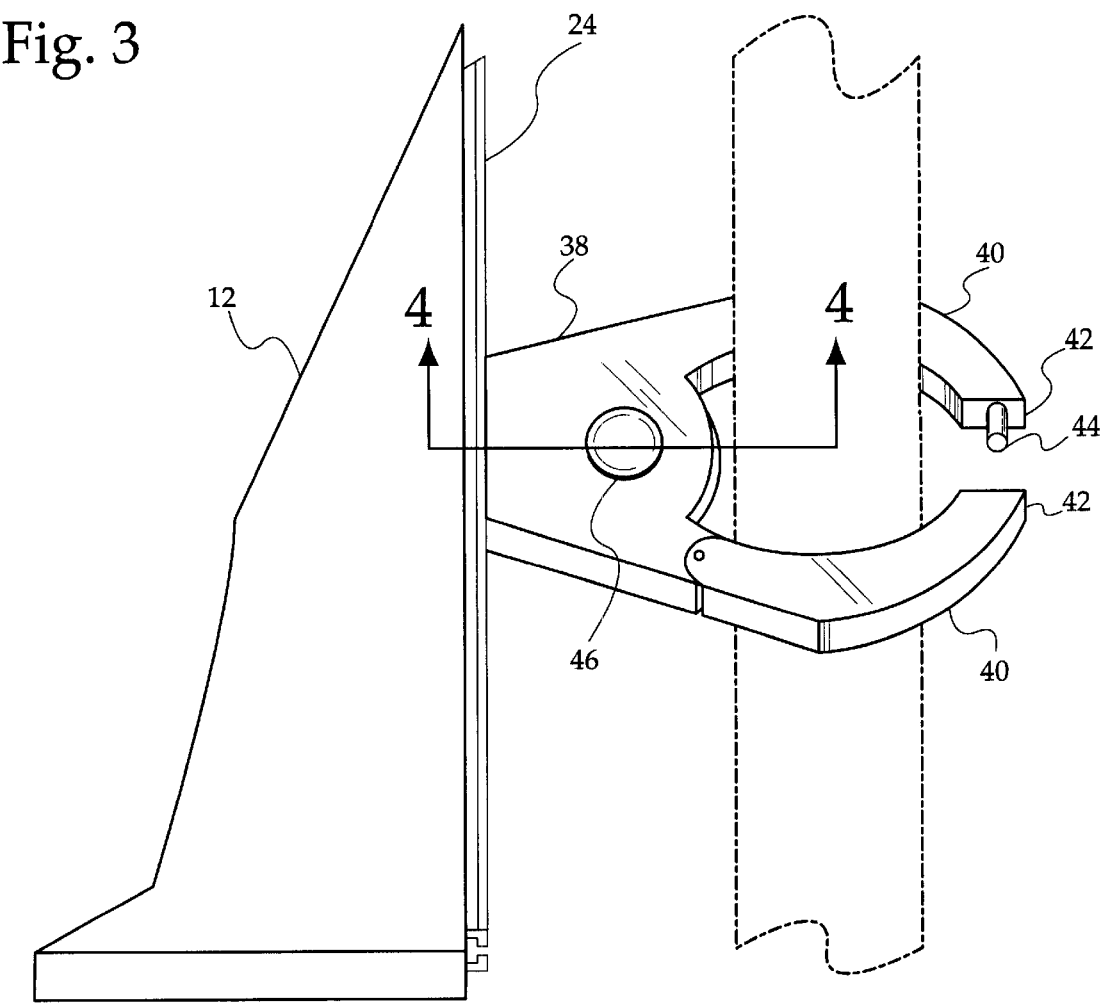
FIG. 3 is a perspective view of one of the clamping members of the present invention.
Figure 4:
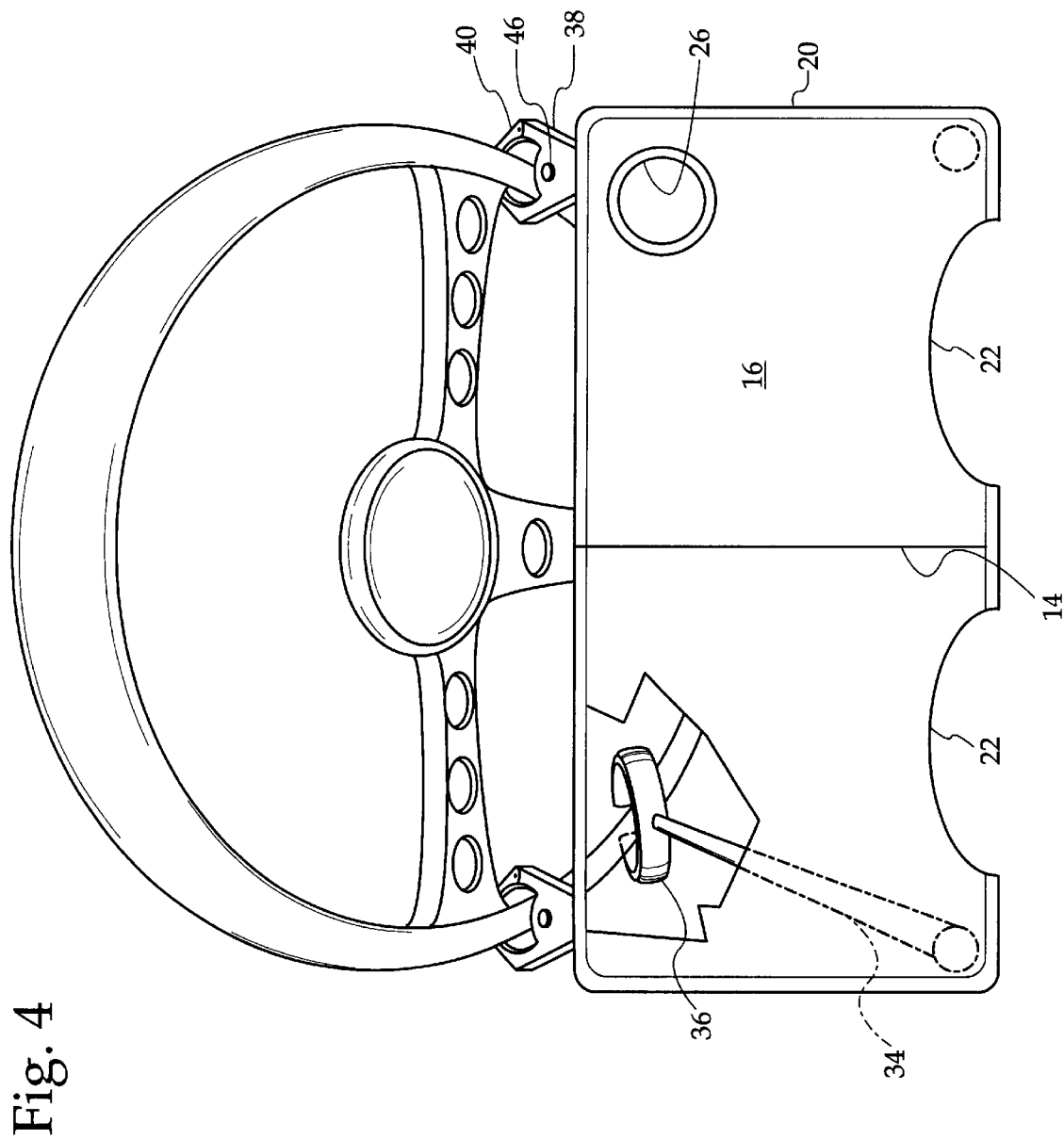
FIG. 4 is a top plan view of the present invention illustrated in use.

With reference now to the drawings, and in particular, to FIGS. 1 through 4 thereof, the preferred embodiment of the new and improved steering wheel attachable table embodying the principles and concepts of the present invention and generally designated by the reference number 10 will be described.

Specifically, it will be noted in the various figures that the device relates to a steering wheel attachable table for allowing a person occupying a vehicle to hold items in a secure manner. In its broadest context, the device consists of a tray portion, a pair of support arms, and a pair of clamping members. Such components are individually configured and correlated with respect to each other so as to attain the desired objective.

The tray portion 12 has a generally rectangular configuration. The tray portion 12 has a central fold line 14. The tray portion 12 has an upper surface 16, a lower surface 18, and an upwardly extending peripheral lip 20. The peripheral lip 20 has a front edge, a back edge, and opposed side edges. The front edge of the peripheral lip 20 and the tray portion 12 have a pair of arcuate recesses 22 extending inwardly thereof. The recesses 22 will be situated to provide more room to accommodate a person's legs when the tray portion 12 is in place. The back edge of the peripheral tray 20 has a track 24 extending a length thereof. The upper surface 16 of the tray portion 12 has a cup receiving recess 26 formed therein.

The pair of support arms 28 extend between the tray portion 12 and a steering wheel 30. The pair of support arms 28 have upper ends 32 secured to the lower surface 18 of the tray portion 12. The pair of arms 28 have angularly disposed segments 34 extending outwardly from the upper ends 32. The angularly disposed segments 34 have free outer ends. The free outer ends each have a pliable clip 36 disposed thereon. The pliable clips 36 are engagable to a lower portion of the steering wheel 30. The support arms 28 attach to the steering wheel 30 to provide lower support to the tray portion 12. The support arms 28 are fixed in the preferred embodiment requiring their placement on the steering wheel 30 prior to the attachment of the clamping members 38.

The pair of clamping members 38 are slidably coupled with the track 24 of the tray portion 12 for removably coupling with the steering wheel 30 above the pliable clips 36 of the pair of support arms 28. The pair of clamping members 38 each have opposed arms 40 with free outer ends 42. The free outer arms 42 receive the steering wheel 30 therebetween. The free outer arms 42 have corresponding locking means 44 with a release button 46 whereby pressing the release button 46 will disengage the locking means 44 allowing the removal of the clamping members 38 from the steering wheel 30. The clamping members 38 will slide within the track 24 to reach the necessary width of the steering wheel 30. Once the proper distance has been reached, the clamping members 38 will be locked around the steering wheel 30. Once finished using the device 10, the release buttons 46 will be pressed allowing the clamping members 38 to be removed followed by the disengagement of the pliable clips 36. This will allow the tray portion 12 to be folded and stored for the next use.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A steering wheel attachable table for allowing a person occupying a vehicle to hold items in a secure manner comprising, in combination:

a tray portion having a generally rectangular configuration, the tray portion having a central fold line, the tray portion having an upper surface, a lower surface, and an upwardly extending peripheral lip, the peripheral lip having a front edge, a back edge, and opposed side edges, the front edge of the peripheral lip and the tray portion having a pair of arcuate recesses extending inwardly thereof, the back edge of the peripheral tray having a track extending a length thereof, the upper surface of the tray portion having a cup receiving recess formed therein;

a pair of support arms extending between the tray portion and a steering wheel, the pair of support arms having upper ends secured to the lower surface of the tray portion, the pair of arms having angularly disposed segments extending outwardly from the upper ends, the angularly disposed segments having free outer ends, the free outer ends each having a pliable clip disposed thereon, the pliable clips being engagable to a lower portion of the steering wheel; and a pair of clamping members slidably coupled with the track of the tray portion for removably coupling with the steering wheel above the pliable clips of the pair of support arms, the pair of clamping members each having opposed arms with free outer ends, the free outer arms receiving the steering wheel therebetween, the free outer arms having corresponding locking means with a release button whereby pressing the release button will disengage the locking means allowing the removal of the clamping members from the steering wheel.

2. A steering wheel attachable table for allowing a person occupying a vehicle to hold items in a secure manner comprising, in combination:

a tray portion having a generally rectangular configuration, the tray portion having an upper surface, a lower surface, and an upwardly extending peripheral lip, the peripheral lip having a front edge, a back edge, and opposed side edges, the back edge of the peripheral tray having a track extending a length thereof;

a pair of support arms extending between the tray portion and a steering wheel; and a pair of clamping members slidably coupled with the track of the tray portion for removably coupling with the steering wheel above the pair of support arms.

3. The steering wheel attachable table as set forth in claim 2, wherein the tray portion has a central fold line.

4. The steering wheel attachable table as set forth in claim 2, wherein the tray portion has a pair of arcuate recesses extending inwardly thereof.

5. The steering wheel attachable table as set forth in claim 2, wherein the upper surface of the tray portion has a cup receiving recess formed therein.

6. The steering wheel attachable table as set forth in claim 2, wherein the pair of support arms have upper ends secured to the lower surface of the tray portion, the pair of arms having angularly disposed segments extending outwardly from the upper ends, the angularly disposed segments having free outer ends, the free outer ends each having a pliable clip disposed thereon, the pliable clips being engagable to a lower portion of the steering wheel.

7. The steering wheel attachable table as set forth in claim 2, wherein the pair of clamping members each have opposed arms with free outer ends, the free outer arms receiving the steering wheel therebetween, the free outer arms having corresponding locking means with a release button whereby pressing the release button will disengage the locking means allowing the removal of the clamping members from the steering wheel.

* * * * *